United States Patent [19]
Weis

[11] Patent Number: 5,694,808
[45] Date of Patent: Dec. 9, 1997

[54] SYSTEM FOR TESTING THE FUNCTION OF A HYDRAULIC DEVICE

[75] Inventor: Helmut Weis, Bad Vilbel, Germany

[73] Assignee: ITT Automotive Europe GmbH, Frankfurt, Germany

[21] Appl. No.: 637,774

[22] PCT Filed: Oct. 26, 1994

[86] PCT No.: PCT/EP94/03523

§ 371 Date: Jul. 10, 1996

§ 102(e) Date: Jul. 10, 1996

[87] PCT Pub. No.: WO95/12761

PCT Pub. Date: May 11, 1995

[30] Foreign Application Priority Data

Nov. 5, 1993 [DE] Germany .................. 4337521.9

[51] Int. Cl.$^6$ ............................................. G01M 19/00
[52] U.S. Cl. ........................................................ 73/168
[58] Field of Search .................... 73/46, 47, 49.7, 73/119 R, 119 A, 168, 40.5 R; 417/63

[56] References Cited

U.S. PATENT DOCUMENTS

| | | |
|---|---|---|
| 3,452,591 | 7/1969 | Phillips et al. . |
| 3,577,776 | 5/1971 | Brown . |
| 3,817,097 | 6/1974 | Heroux . |
| 4,598,579 | 7/1986 | Cummings . |
| 5,000,664 | 3/1991 | Lawless et al. . |
| 5,113,705 | 5/1992 | Farnhardt . |
| 5,499,530 | 3/1996 | Vondell et al. . |

FOREIGN PATENT DOCUMENTS

| | | |
|---|---|---|
| 0310113 | 4/1989 | European Pat. Off. . |
| 0487507 | 5/1992 | European Pat. Off. . |
| 9002066 | 3/1990 | WIPO . |

OTHER PUBLICATIONS

Search Report of the German Patent Office for Application No. P4337521.9.

*Primary Examiner*—Robert Raevis
*Attorney, Agent, or Firm*—Thomas N. Twomey; J. Gordon Lewis

[57] ABSTRACT

A system for testing the operability of hydraulic devices, in particular pumps, by way of a compressible medium, for example air. In addition, the testing method disclosed permits tracing other defects which may appear.

8 Claims, 1 Drawing Sheet

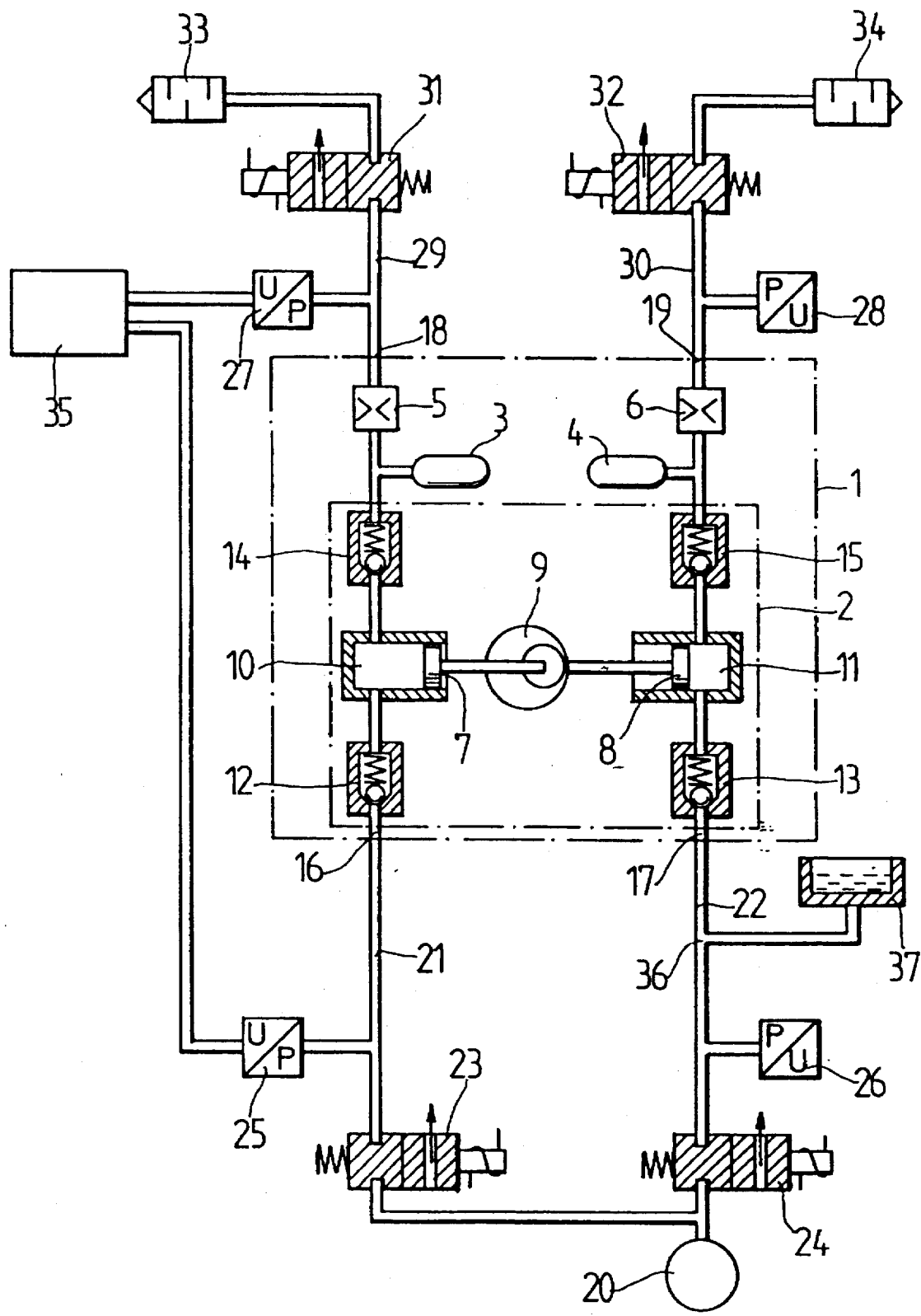

SYSTEM FOR TESTING THE FUNCTION OF A HYDRAULIC DEVICE

TECHNICAL FIELD

The present invention relates to a method of testing the function of a hydraulic device, more particularly, a device for converting mechanical into hydraulic energy, for example, a pump for incompressible media, according to the preamble of claim 1.

BACKGROUND OF THE INVENTION

In prior art methods of testing the function of hydraulic pumps, the function of the pumps is tested under operating conditions. To this end, the hydraulic medium is supplied from the pump, and the medium flow rate and the pump outlet pressure are checked. If the values are within the nominal tolerance range, the pump is considered operable.

A disadvantage of this so-called wet testing is that fluid is in the pump and must be removed before the pump is delivered from the manufacturer to the user. Cleaning the pump necessitates intricate work, and it is impossible to remove the hydraulic medium 100 percent without considerable effort. This effort is compounded when the pump is intended for use in a hydraulic brake system for automotive vehicles, such as an ABS/TCS system, because those systems are typically filled using vacuum techniques. When using vacuum techniques, the pump must not contain remnant fluid because otherwise vacuum filling of the brake system would be extremely time consuming. This is because the entire fluid which is still in the pump would have to be pumped off initially to provide a vacuum. This requirement involves excessive time even for small amounts of fluid.

U.S. Pat. No. 4,598,579 discloses a method of testing the function of an individual hydraulic component part for incompressible media by way of a compressible medium. A disadvantage in the prior art arrangement is that, for reducing disturbances caused by the components of the measuring system, the design of the measuring system must be conformed especially to the testing of the above individual component part by using a compressible medium.

Therefore, an object of the present invention is to propose a method of testing the function of hydraulic devices, permitting the delivery of virtually dry devices, in particular pumps, and eliminating the above-mentioned drawbacks.

Another object of the present invention is to provide a function testing method which is as inexpensive as possible and, in addition, permits tracing possible production defects.

Accordingly, the invention proposes testing a completely assembled device including a plurality of individual hydraulic components and using a compressible medium for testing instead of the incompressible hydraulic medium, i.e., the given operating medium of the device. The device may be a pump, a motor or a turbine, etc. In the simplest case, air will be used, for example, oil-free compressed air, but the use of gases such as nitrogen, helium, or even steam is also possible.

The method of testing the function of hydraulic devices according to the present invention is based on the idea that a no-load operation test of the device is sufficient to check the tightness and proper interaction of all structural elements of the device. That means, structural elements which do not function in the virtual operation will be detected during the function test by way of the compressible medium.

The pressure is measured at the pressure fluid inlets and outlets of the device during the function test. Such measuring operations can be performed by low-cost and easy-to-install pressure sensors. A complicated determination of the supply rate is not necessary.

In this arrangement, it is appropriate that the power operating the device to be tested is conformed to the properties of the compressible medium, meaning the drive power with respect to a pump and the output for a motor. To ensure a reproducible function test, the power can be chosen to be superior or inferior to the given nominal capacity. This will eliminate resonant vibrations of the compressible medium or other undesirable effects.

A determined starting pressure is initially applied to the device to be tested. On the one hand, this serves to provide a defined initial condition, such as pressing seals against their sealing seats, and to perform a first leakage test, on the other hand. The appropriate starting pressure depends, for example, on the configuration of the working chambers of the device to be tested and has to be adapted accordingly.

Conclusions with respect to operability and, also, defects in the device may be drawn from the time-responsive course of the measured pressures p(t) which are recorded and analyzed. The time-responsive course can be compared with predetermined courses, found by experiments, for example, for analysis. However, it is also possible to initially process the measured values, for example, by forming the difference or the ratio, by forming the time derivative, the integration, etc., and to compare these values with predetermined values. It has been found that, even in devices having a plurality of separately operated hydraulic circuits, the test results of the individual circuits are independent from each other, provided a suitable choice of the parameters that are adjustable for the function test. This means that an error function in one circuit does not have an effect on the measurement results of the other circuit(s).

The function test is simplified when taking into account only individual pressure values measured at different points of time. When the points of time are suitably chosen, already a small number of discreet measured values will be sufficient to recognize operability or possibly existing function defects of the device. Thus, the entire course of curve p(t) is not absolutely necessary for testing.

It has been found that already two pressure values, obtained by measurement at different points of time, are sufficient for testing. If the values $p(t_1)$, the difference $p_d = p(t_1) - p(t_2)$ or the ratio $V = p(t_1):p(t_2)$ are in a determined test window around a predetermined nominal value $p_{lsoll}$, $p_{dsoll}$ or $V_{soll}$, operability of the pump is proven. If the corresponding values are outside the predetermined test window, which may amount to ±10%, for example, the defects which occurred can be localized by way of the direction and the magnitude of the discrepancy. The defects can be defective seals, lacking seals, interchanged seals, etc.

The proposed testing method is especially suited for piston pumps having non-return valves connected upstream or downstream of the piston(s). In this arrangement, it is possible to simultaneously check the function of the non-return valves and their tightness, and an exact piston stroke. This function test can also be performed by comparison of values found by experiments.

If a small volume portion of an incompressible medium, for example, the given hydraulic fluid in the form of fog (drips) or steam, is added to the compressible medium lubrication of the device for the length of the function test can be achieved. However, the need for such a lubrication is obviated if a sufficient quantity of lubricant has already been added during assembly of the device, and the function test requires only short-term operation of the device. Non-destructive function testing can also be ensured this way.

BRIEF DESCRIPTION OF THE DRAWINGS

FIGURE 1 is a diagrammatic depiction of the system of the present invention.

DETAILED DESCRIPTION OF THE DRAWINGS

A device 1, shown in the drawing, generally includes pump 2, pressure accumulators 3, 4 and restrictors 5, 6. Pump 2 has two hydraulically isolated circuits with one piston 7, 8 each, driven by an eccentric 9. This is schematically shown in the drawing. Each of the pistons 7, 8 defines a working chamber 10, 11. Piston movement caused by the eccentric varies the volume of the working chambers 10, 11. One suction valve 12, 13 and one pressure valve 14, terminates into each of the working chambers 10, 11. The valves take the shape of non-return valves having a predetermined preload.

Detailed description of the design of valves 12 to 15, their seals and the seals between the pistons 7, 8 and the working chambers 10, 11 is omitted. Also, the operation of an eccentric-driven pump is prior art knowledge and, therefore, does not need detailed description.

To perform the function test according to the present invention, the device 1 is connected on the inlet side to a compressed-air source 20 by way of pneumatic lines 21 and 22. One two-way/two-position directional control valve 23, 24, which is electromagnetically operable and closes the connection in its non-actuated condition, is respectively inserted between the compressed-air source 20 and lines 21, 22. Further, pressure sensors 25, 26 are arranged on lines 21, 22 to convert the prevailing pressure into an electric voltage signal. Pressure sensors 27, 28 are provided on pneumatic lines 29, 30 at outlets 18, 19 of the device 1. The lines 29, 30 are connected to pressure-discharge means 33, 34 by way of each one normally closed two-way/two-position directional control valve 31, 32. The pressure sensors 25, 26, 27, 28 and the valves 23, 24, 31, 32 are connected to a controlling and analyzing unit 35.

Function test cycle:

Initially, the unpressurized lines 21, 22 are connected to the inlets 16, 17, and the lines 29, 30 are connected to the outlets 18, 19 of the device 1. The predetermined starting pressure $p_0$ is provided in the lines 21 or 22 at time t0. To this end, valves 23 or 24 are correspondingly opened by the controlling unit 35 in response to the signals of the pressure sensors 25 and 26.

Valves 23 and 24 are closed at a later time $t_1$, and the pressure value $p(t_1)$, respectively measured by pressure sensors 27 or 28 at this time, is recorded. If this value is within a predetermined range of errors, around the nominal value $p_{soll}(t_1)$, the first test criterion is satisfied. If, possibly, the preload of the valves 12 to 15 is too high, $p(t_1)$ will be below acceptable limits (lower than $p_{soll}(t_1)$). If leakage occurs $p(t_1)$ will be considerably lower than $p_{soll}(t_1)$. If the preload of one of the pressure valves 18, 19 is too low, $P(t_1)$ will be too high.

After recordal of the test values at time $t_1$, pump 2 is started. The pump is operated by a reduced power, thereby avoiding resonant vibrations of the compressible medium. At a later time $t_2$, the current value $p(t_2)$ at pressure sensors 27 and 28 is read out. If the difference $P_d=p(t_1)-p(t_2)$ is in a predetermined range of errors around the value $p_{dsoll}$, another criterion determining the operability of the pump is satisfied. If p is superior to or inferior to the admissible range of errors around $f_{dsoll}$, the existence of defects, such as interchanged sealing elements, may be concluded from this fact. Also, the ratio of $V=p(t_1): p(t_2)$ can be taken into account for this purpose. This ratio also permits concluding the proper filling of the working chambers 10, 11, (i.e., the exact stroke of the pistons).

The pump can be disconnected and pressure relief of the device 1 can be through valves 31, 32 after recordal of the test values at time $t_2$. The controlling and analyzing unit 35 will now signal whether the device 1 is operable, or whether a defect, if at all, which type of defect, was found. This information will permit searching for the defect and eliminating the defect, if necessary.

An optional injection device 36, schematically shown on line 22, may serve to inject a small amount of hydraulic medium from a reservoir 37 into the compressed air, filling the device 1 at the commencement of the operation, thereby lubricating the device 1.

I claim:

1. A method of testing the function of a hydraulic pump for pumping incompressible media, said pump of the type including an input port and an output port, comprising the steps of:

A) pressurizing the input port with a compressible medium,

B) measuring the pressure present at the input and output ports of said hydraulic pump when said hydraulic pump is not activated to verify tightness and proper interaction of all structural elements of said pump, C) coupling non-return valves to said input and output ports of said hydraulic pump, D) measuring the pressure present at one of the input and output ports of said hydraulic pump when said hydraulic pump is activated, E) comparing at least one of said input pressure or said output pressure measured in step D with predetermined pressure data to determine the functionality of said hydraulic pump.

2. A method as claimed in claim 1, further including the step of coupling the hydraulic pump to a power operating device and conforming the power operating device to the properties of the compressible medium.

3. A method as claimed in claim 2, wherein a determined starting pressure ($p_0$) is applied to at least one of the input port or the output port of said hydraulic pump before the hydraulic pump is activated.

4. A method as claimed in claim 1, wherein step D further includes the substeps of comparing at least one of said input pressure or said output pressure with predetermined pressure data, wherein the predetermined data includes time responsiveness data.

5. A method as claimed in claim 1 further including measuring, at different times, the pressure at both the input and output ports of the hydraulic pump at different times to determine the operability or lack of operability of said hydraulic pump.

6. A method as claimed in claim 1, wherein the pressure values $(p(t_1), (p(t_2))$ are measured at two times $(t_1,t_2)$ from at least one of said input and output ports of said hydraulic pump, and operability or defects causing a malfunction of the hydraulic pump are concluded from at least one of the value of $(p(t_1))$, the difference $(p_d=p(t_1)-p(t_2))$, and the ratio $(V=p(t_1); p(t_2))$ of the pressure values.

7. A system for testing the operability of a hydraulic pump, said pump including an input and output port, comprising:

a compressed-air source connected to said input port, one valve interposed between the compressed-air source and the input port, a first pressure sensor coupled to the input port and a second pressure sensor coupled to the outlet port, said pressure sensors converting the prevailing pressure into an electric voltage signal, analyzing unit coupled to said first and second pressure sensors for comparing said electric voltage signals emanating from said sensors to predetermined data to indicate existing defects of the hydraulic pump.

8. A method of testing the function of a hydraulic pump for pumping incompressible media, said pump of the type including an input port and an output port, comprising the steps of:

A) pressurizing the input port with a compressible medium,

B) measuring the pressure present at the input and output ports of said hydraulic pump when said hydraulic pump is not activated to verify tightness and proper interaction of all structural elements of said pump, C) measuring the pressure present at one of the input and output ports of said hydraulic pump when said hydraulic pump is activated, D) comparing at least one of said input pressure or said output pressure measured in step C with predetermined pressure data to determine the functionality of said hydraulic pump, and E) adding a lubricant to said compressible medium.

* * * * *